United States Patent
Li et al.

(10) Patent No.: US 11,935,213 B2
(45) Date of Patent: Mar. 19, 2024

(54) LAPAROSCOPIC IMAGE SMOKE REMOVAL METHOD BASED ON GENERATIVE ADVERSARIAL NETWORK

(71) Applicant: Shandong Normal University, Shandong (CN)

(72) Inventors: Dengwang Li, Shandong (CN); Pu Huang, Shandong (CN); Tingxuan Hong, Shandong (CN); Jie Xue, Shandong (CN); Hua Lu, Shandong (CN); Xueyao Liu, Shandong (CN); Baolong Tian, Shandong (CN); Changming Gu, Shandong (CN); Bin Jin, Shandong (CN); Xiangyu Zhai, Shandong (CN)

(73) Assignee: Shandong Normal University, Shandong (CN)

( * ) Notice: Subject to any disclaimer, the term of this patent is extended or adjusted under 35 U.S.C. 154(b) by 0 days.

(21) Appl. No.: 18/183,173

(22) Filed: Mar. 14, 2023

(65) Prior Publication Data
US 2023/0377097 A1  Nov. 23, 2023

(30) Foreign Application Priority Data
May 18, 2022  (CN) .......................... 202210536151.3

(51) Int. Cl.
*G06T 5/00* (2006.01)
*G06T 7/00* (2017.01)

(52) U.S. Cl.
CPC ............ *G06T 5/002* (2013.01); *G06T 7/0012* (2013.01); *G06T 2207/20084* (2013.01); *G06T 2207/20172* (2013.01); *G06T 2207/30092* (2013.01)

(58) Field of Classification Search
CPC .......... G06T 2207/20084; G06T 2207/10068; G06V 10/273
See application file for complete search history.

(56) References Cited

U.S. PATENT DOCUMENTS

2022/0346855 A1\* 11/2022 Xu ....................... G06V 10/462
2022/0366618 A1\* 11/2022 Gubbi Lakshminarasimha .......... G06V 10/56

(Continued)

FOREIGN PATENT DOCUMENTS

| CN | 113066026 A | \* | 7/2021 | ........... G06N 3/0445 |
| CN | 113673562 | | 11/2021 | |
| CN | 114638767 A | \* | 6/2022 | |

OTHER PUBLICATIONS

Salazar-Colores, Sebastián & Jiménez, Hugo & César, Javier & Ortiz Echeverri, Cesar & Flores, Gerardo. (2020). Desmoking Laparoscopy Surgery Images Using an Image-to-Image Translation Guided by an Embedded Dark Channel. IEEE Access. 8. 10.1109/ACCESS.2020.3038437. (Year: 2020).\*

(Continued)

*Primary Examiner* — Gandhi Thirugnanam
(74) *Attorney, Agent, or Firm* — JCIPRNET

(57) ABSTRACT

A laparoscopic image smoke removal method based on a generative adversarial network, and belongs to the technical field of computer vision. The method includes: processing a laparoscopic image sample to be processed using a smoke mask segmentation network to acquire a smoke mask image; inputting the laparoscopic image sample to be processed and the smoke mask image into a smoke removal network, and extracting features of the laparoscopic image sample to be processed using a multi-level smoke feature extractor to acquire a light smoke feature vector and a heavy smoke feature vector; and acquiring, according to the light smoke feature vector, the heavy smoke feature vector and the (Continued)

smoke mask image, a smoke-free laparoscopic image by filtering out smoke information and maintaining a laparoscopic image by using a mask shielding effect. The method has the technical effects of robustness and ability of being embedded into a laparoscopic device for use.

8 Claims, 6 Drawing Sheets

(56) References Cited

U.S. PATENT DOCUMENTS

| | | | |
|---|---|---|---|
| 2023/0047937 A1* | 2/2023 | Gubbi Lakshminarasimha | ......... G06T 5/50 |
| 2023/0186602 A1* | 6/2023 | Fouts | ............ G06V 10/764 382/159 |

OTHER PUBLICATIONS

Chen L, Tang W, John NW, Wan TR, Zhang JJ. De-smokeGCN: Generative Cooperative Networks for Joint Surgical Smoke Detection and Removal. IEEE Trans Med Imaging. May 2020;39(5):1615-1625. (Year: 2020).*

Sidorov, Oleksii & Wang, Congcong & Alaya Cheikh, Faouzi. (2019). Generative Smoke Removal. https://ml4health.github.io/2019/pdf/94_ml4h_preprint.pdf (Year: 2019).*

Long Chen et al., "De-smokeGCN: Generative Cooperative Networks for Joint Surgical Smoke Detection and Removal", IEEE Transactions on Medical Imaging, vol. 39, Issue 5, May 2020, pp. 1615-1625.

* cited by examiner

Output image

Input image

LAPAROSCOPIC IMAGE SMOKE REMOVAL METHOD BASED ON GENERATIVE ADVERSARIAL NETWORK

CROSS-REFERENCE TO RELATED APPLICATION

This application claims the priority benefit of China application serial no. 202210536151.3 filed on May 18, 2022. The entirety of the above-mentioned patent application is hereby incorporated by reference herein and made a part of this specification.

BACKGROUND

Technical Field

The present disclosure relates to the technical field of computer vision, in particular to a laparoscopic image smoke removal method based on a generative adversarial network.

Description of Related Art

Laparoscopic surgery is widely used in various surgical fields due to its low infection rate, quick recovery, and fewer complications. In conventional laparoscopic surgery, a high-frequency electrosurgical generator and an ultrasonic scalpel with an electrocautery function are used for hemostasis according to the following principle: A heating source is directly applied to a human tissue, so that the tissue is burned or carbonized to achieve the purpose of hemostasis. This high-frequency electrosurgical generator or ultrasonic scalpel has an effect of greatly increasing the success rate of the laparoscopic surgery. However, the use of the high-frequency electrosurgical generator and the ultrasonic scalpel for the laparoscopic surgery still has the following defects: When the heating source is directly applied to the human tissue for hemostasis, a large amount of smoke will be generated, resulting in loss of the visibility of a laparoscopic surgery image. In this case, a surgeon needs to stop the operation and remove surgical instruments from a working channel until the laparoscopic surgery image is visible again. As a result, the operation duration is prolonged, and the work intensity of the surgeon and the probability of decision-making errors are increased. An existing method for mechanical smoke removal using a medical device has the problem that it is not suitable for a real-time operation scenario such as image-guided surgery, and will lead to an increase in the treatment cost.

In the prior art, there are intelligent smoke removal methods based on an atmospheric scattering model, a dark channel priori model and a Bayesian inference model. The atmospheric scattering model is one of the most classic models to describe hazy or smoke images. However, the conditional assumptions of the atmospheric scattering model are that the global atmospheric light is uniform, a light source is far away, and light rays are parallel to each other. However, in the scenario of laparoscopic surgery, the concentration of smoke varies greatly, and the light source is close to human organs and tissues, making it difficult to predict the transmission map, resulting in an unsatisfactory smoke removal effect. The conditional assumption of the dark channel priori model is based on the fact that image pixels should have at least one color channel with an extremely low intensity value. However, in the scenario of the laparoscopic surgery, a large color difference in an image and a short distance between the light source and a tissue surface lead to the problem of specular reflection. The Bayesian inference model proposes multiple priori conditions to model a color and texture of smoke images through a probability map and a sparse dictionary. However, in the scenario of laparoscopic surgery, due to a complex and non-uniform distribution of a smoke, there is a problem of image distortion caused by over-enhancement of an image.

With the development of an image processing technology and a deep learning technology, some deep learning-based image smoke removal models have been widely proposed, showing excellent results on smoke removal. Morales P et al. proposed an efficient fully convolutional neural network (CNN) for natural image dehazing processing, in which, a pair of encoder-decoder was used for estimating atmospheric light and a transmission map. The method takes a foggy image and its pyramid decomposition as inputs, and directly outputs a fogless image. Sidorov O et al. proposed a generative adversarial network (GAN) architecture based on unsupervised image-to-image transformation for smoke removal from a laparoscopic image, and used the image rendering software Blender to simulate real smoke for matching training. Chen L et al. proposed a De-smokeGCN for laparoscopic smoke detection and removal. A smoke detection module was added to a generative adversarial based framework to detect the location and density of smoke and generate a smoke mask. This additional information can improve a training process of the GAN and achieve a better smoke removal effect. However, there are still disadvantages as follows:

Although the above methods perform well in a fog removal scenario, compared with fog, the distribution of smoke has higher variability (for example, locality and non-uniformity), and it is not appropriate to use the fog removal method to remove smoke in laparoscopic images. The traditional fog removal method lacks certain robustness in smoke removal, and the existing network model is poor in details of a restored image, and cannot be embedded in laparoscopic equipment for use.

Therefore, it is an urgent need for a laparoscopic image smoke removal method with a good effect of restoring image details.

SUMMARY

The present disclosure provides a laparoscopic image smoke removal method and system based on a generative adversarial network, an electronic device, and a storage medium, so as to solve at least one technical problem in the prior art.

In order to achieve the above-mentioned purpose, the present invention provides a laparoscopic image smoke removal method based on a generative adversarial network. The method includes:

processing a laparoscopic image sample to be processed using a smoke mask segmentation network to acquire a smoke mask image, wherein the smoke mask image includes smoke position information and smoke density information;

inputting the laparoscopic image sample to be processed and the smoke mask image into a smoke removal network, and extracting features of the laparoscopic image sample to be processed using a multi-level smoke feature extractor to acquire a light smoke feature vector and a heavy smoke feature vector; and acquiring, according to the light smoke feature vector, the heavy smoke feature vector and the smoke mask image, a smoke-free laparoscopic image by filtering out smoke information and maintaining a laparoscopic image by using a mask shielding effect.

Further, preferably, the smoke removal network includes a dual-domain generator network and a dual-domain discriminator network; the dual-domain generator network and the dual-domain generator network are trained in the generative adversarial network together; the dual-domain generator network includes a source domain generator configured to generate a predicted smoke image, and a target domain generator configured to generate a predicted smoke-free image; and the dual-domain discriminator network includes a source domain discriminator configured to distinguish a real smoke image from the predicted smoke image, and a target domain discriminator configured to distinguish a real smoke-less image from the predicted smoke-free image.

Further, preferably, the method for extracting the features of the laparoscopic image sample to be processed using the multi-level smoke feature extractor to acquire the light smoke feature vector and the heavy smoke feature vector includes:
- the multi-level smoke feature extractor including a backbone network F1, a branch network F2, and a branch network F3; inputting the laparoscopic image sample to be processed into the backbone network F1 for feature extraction;
- performing two-fold downsampling and four-fold downsampling respectively on the laparoscopic image sample to be processed, and taking sampled images respectively as inputs of the branch network F2 and the branch network F3;
- extracting a low-level smoke texture information feature using the branch network F2, and extracting a high-level smoke semantic information feature using the branch network F3; and
- acquiring, by the F1 backbone network, the light smoke feature vector and the heavy smoke feature vector according to the low-level smoke texture information feature and the high-level smoke semantic information feature.

Further, preferably, the smoke mask segmentation network and the smoke removal network are trained through a training set, and a method for acquiring the training set includes:
- labeling a laparoscopic surgery video data set to acquire a real smoke laparoscopic image and a real smoke-free laparoscopic image;
- processing the real smoke-free laparoscopic image using image rendering software Blender to acquire a synthetic smoke laparoscopic image corresponding to the real smoke-free laparoscopic image; and
- forming the training set by the real smoke laparoscopic image, the real smoke-free laparoscopic image and the synthetic smoke laparoscopic image.

Further, preferably, the smoke mask segmentation network and the smoke removal network perform training constraining using a loss function, and the loss function is achieved by the following formula:

$$L_{Net} = L_{GAN}(G_x, D_x, S, SF) + \lambda_1 L_{cyc}(G_x, G_y) + \lambda_2 L_{sap}(x) + \lambda_3 L_{dcp}(x) + \lambda_4 L_{ce}(x)$$

where $L_{GAN}(G_x, D_x, S, SF)$ is an adversarial loss used for training the generative adversarial network; $L_{cyc}(G_x, G_y)$ is a cycle consistency loss used for training a generator network; $L_{dcp}$ is a dark channel priori loss used for training a discriminator network; $L_{sap}$ is a smoke area perception loss used for training the smoke mask segmentation network; $L_{ce}$ is a contrast loss; and $\lambda_1, \lambda_2, \lambda_3,$ and $\lambda_4$ are loss function hyperparameters.

Further, preferably, the smoke area perception loss is achieved by the following formula:

$$L_{sap}(x) = \frac{1}{N}\left[a_1 \sum_{x \in R} U_D(x) + \sum_{x \in R} M_x U_D(x)\right]$$

where $U_D(x) = |U_{GT}(x) - U_{OUT}(x)|$ where N represents the total number of image pixels; R represents a smoke area recognized by the smoke mask segmentation network in an input image; x represents an index in the image; UGT and UOUT respectively represent a real image and a network output image; a1 represents a penalty weight in a smoke-free area; Mx represents a smoke area penalty weight; and $a_1=0.2$; $M_x \subset [0.5,1]$, the penalty weight a1 in the smoke-free area is a fixed value; and in a smoke area, the smoke area penalty weight Mx is set according to the intensity in real smoke.

Further, preferably, the cycle consistency loss is achieved by the following formula:

$$L_{cyc}(G_x, G_y) = |G_x(G_y(sf)) - sf| + |G_y(G_x(s)) - s|$$

where sf is the target domain; s is the source domain; and Gx and Gy are respectively the target domain generator and the source domain generator.

In order to solve the above-mentioned problems, the present invention further provides a laparoscopic image smoke removal system based on a generative adversarial network. The system includes:
- a mask generation unit, configured to process a laparoscopic image sample to be processed using a smoke mask segmentation network to acquire a smoke mask image, wherein the smoke mask image comprises smoke position information and smoke density information;
- a feature generation unit, configured to input the laparoscopic image sample to be processed and the smoke mask image into a smoke removal network, and process the laparoscopic image sample to be processed using a multi-level smoke feature extractor to acquire a light smoke feature and a heavy smoke feature; and
- a smoke-free image acquisition unit, configured to acquire, according to the light smoke feature vector, the heavy smoke feature vector and the smoke mask image, a smoke-free laparoscopic image by filtering out smoke information and maintaining a laparoscopic image by using a mask shielding effect.

In order to solve the above-mentioned problems, the present invention further provides an electronic device, the electronic device including:
- a memory storing at least one instruction; and a processor executing the instructions stored in the memory to achieve the steps in the above-mentioned laparoscopic image smoke removal method based on a generative adversarial network.

The present invention further provides a computer-readable storage medium, storing a computer program, the computer program, when executed by a processor, implementing the above-mentioned laparoscopic image smoke removal system based on a generative adversarial network.

The laparoscopic image smoke removal method and system based on the generative adversarial network, the electronic device, and the storage medium of the present invention have the following beneficial effects:

1) The smoke mask image is acquired by means of setting the smoke mask segmentation network. The smoke-free laparoscopic image is acquired according to the smoke mask image using the smoke removal network. Real details of the smoke-free area are maintained during the removal of the smoke.
2) Adversarial training is performed on the sample via the dual-domain discriminator network and the dual-domain generator network, and an effect of improving the texture details of the smoke-free laparoscopic image is achieved.
3) The laparoscopic image smoke removal method based on the generative adversarial network of the present invention has the robustness, and can be embedded into a laparoscopic device for use.

The achievement of objectives, function characteristics, and advantages of the present invention will be further described in combination with embodiments and with reference to accompanying drawings.

DESCRIPTION OF THE EMBODIMENTS

It should be understood that the specific embodiments described here are merely to explain the present invention, and not intended to limit the present invention.

The embodiments of the present application can acquire and process related data based on an artificial intelligence technology and a computer vision technology. Artificial Intelligence (AI) is a theory, method, technology and application systems that use a digital computer or a machine controlled by a digital computer to simulate, extend and expand human intelligence, sense the environment, acquire knowledge, and use the knowledge to obtain best results. In other words, the AI is a comprehensive technology of computer science that attempts to understand the essence of intelligence and produce a new intelligent machine that can make a response in a similar way to the AI. The AI is to study the design principles and implementation methods of various intelligent machines, so that the machines have perception, reasoning and decision-making functions. The AI technology is a comprehensive discipline involving a wide range of fields, including a hardware-level technology and a software-level technology. The basic technologies of AI generally include technologies such as a sensor, a special AI chip, cloud computing, distributed storage, a big data processing technology, an operating/interacting system, and mechatronics. The AI software technology mainly includes computer vision, speech processing, natural language processing, machine learning/deep learning, and the like.

The computer vision (CV) is a science that studies how to make machines "see". Further, it refers to machine vision using a camera and a computer to replace human eyes to recognize, track and measure targets, and further conducting graphic processing, so that the computer processes images that are more suitable for human eye observation or being transmitted to instruments for detection. As a scientific discipline, related theories and technologies are studied by the computer vision, trying to build AI systems that can acquire information from images or multidimensional data. The computer vision technology usually includes image processing, image recognition, image semantic comprehension, image retrieval, optical character recognition (OCR), video processing, video semantic comprehension, video content/behavior recognition, 3D object reconstruction, 3D technology, virtual reality, augmented reality, simultaneous localization and mapping, and the like, and also includes common biometric features recognition technologies such as face recognition and fingerprint recognition.

Figure 1:
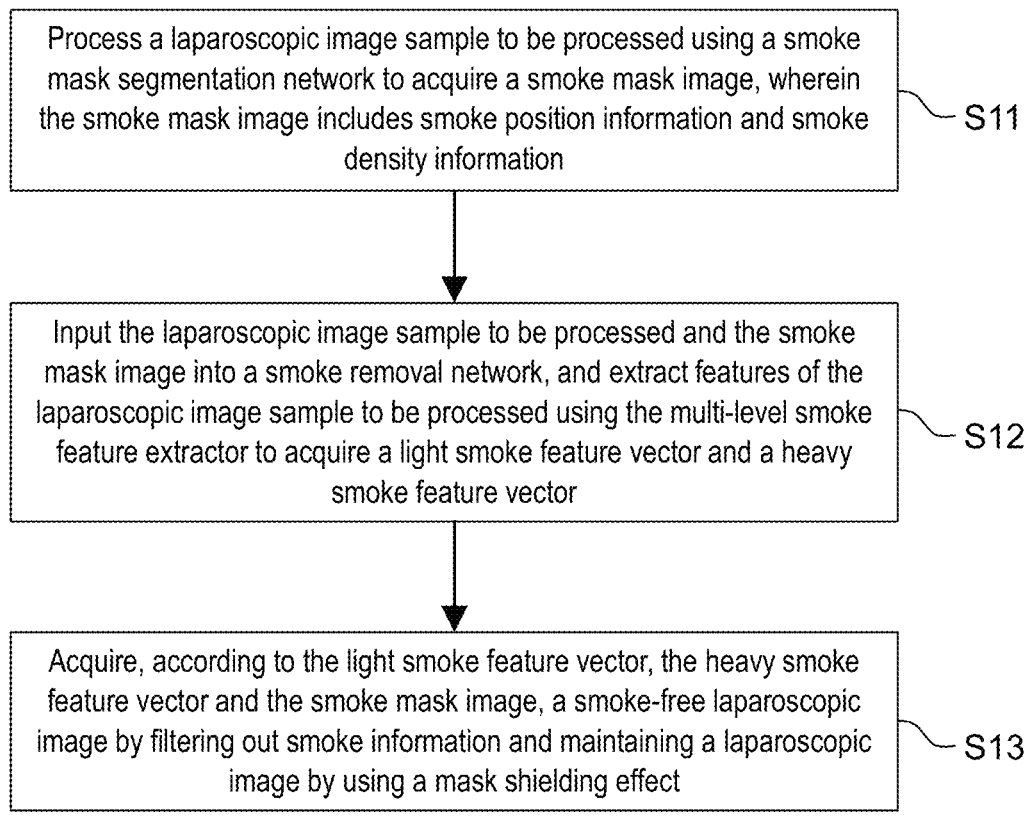
FIG. 1 is a flowchart of a laparoscopic image smoke removal method based on a generative adversarial network according to an embodiment of the present invention.

Specifically, as an example, FIG. 1 is a flowchart of a laparoscopic image smoke removal method based on a generative adversarial network according to an embodiment of the present invention. Referring to FIG. 1, the present invention provides a laparoscopic image smoke removal method based on a generative adversarial network. The method may be implemented by one apparatus. The apparatus may be implemented by software and/or hardware. The laparoscopic image smoke removal method based on the generative adversarial network includes steps S110-S130.

Specifically, S110, a laparoscopic image sample to be processed is processed using a smoke mask segmentation network to acquire a smoke mask image, wherein the smoke mask image includes smoke position information and smoke density information; S120, the laparoscopic image sample to be processed and the smoke mask image are input into a smoke removal network, and features of the laparoscopic image sample to be processed are extracted using a multi-level smoke feature extractor to acquire a light smoke feature vector and a heavy smoke feature vector; and S130, a smoke-free laparoscopic image is acquired according to the light smoke feature vector, the heavy smoke feature vector and the smoke mask image by filtering out smoke information and maintaining a laparoscopic image by using a mask shielding effect.

Figure 2:
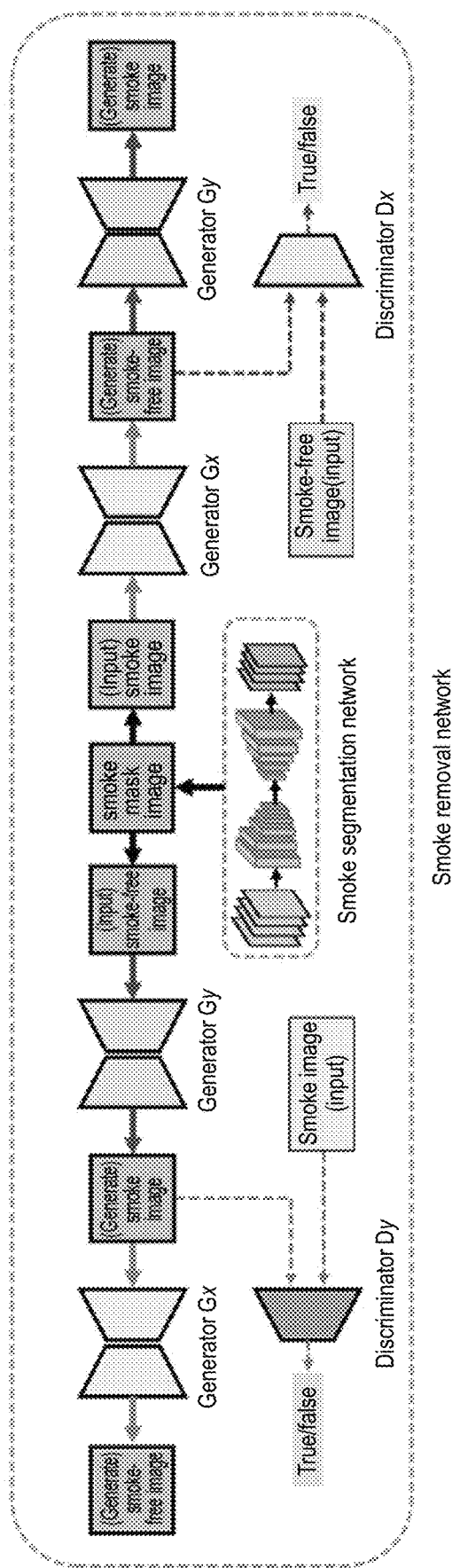
FIG. 2 is a schematic diagram of a smoke removal network of a laparoscopic image smoke removal method based on a generative adversarial network according to an embodiment of the present invention.
Figure 3:
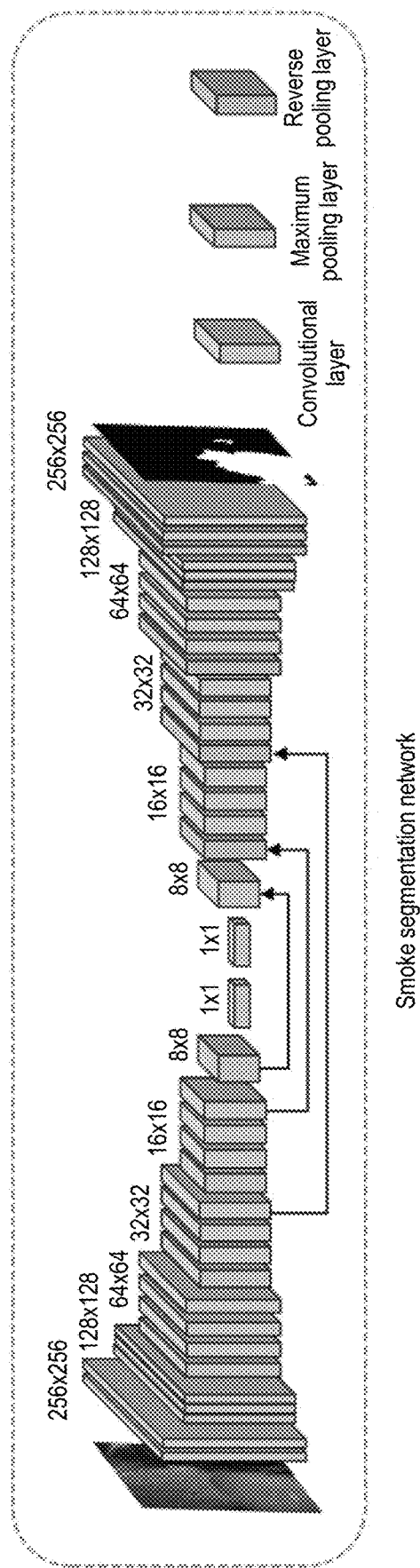
FIG. 3 is a schematic diagram of a smoke segmentation network of a laparoscopic image smoke removal method based on a generative adversarial network according to an embodiment of the present invention.

FIG. 2 and FIG. 3 overall illustrate the principle of the laparoscopic image smoke removal method based on the generative adversarial network. FIG. 2 is a schematic diagram of a smoke removal network of a laparoscopic image smoke removal method based on a generative adversarial network according to an embodiment of the present invention. FIG. 3 is a schematic diagram of a smoke segmentation network of a laparoscopic image smoke removal method based on a generative adversarial network according to an embodiment of the present invention. As shown in FIG. 2 and FIG. 3, for the distribution characteristics of smoke in a laparoscope application scenario, the present invention provides a laparoscopic image smoke removal model based on a generative adversarial network, including a smoke mask segmentation network and a smoke removal network. The smoke mask segmentation network can generate a smoke mask image of a laparoscopic image. The smoke mask image includes smoke position information and smoke density information. The smoke mask image is input to the smoke removal network, so that real details of a smoke-free area can be maintained while the smoke is removed.

The smoke mask segmentation network takes a single RGB laparoscopic image as an input, and generates a smoke mask with the same input size. The smoke mask segmentation network is a typical encoder-decoder structure. The smoke mask segmentation network (SSN) may be, but is not limited to, a VGG16 network model. In one specific embodiment, the specific structure of the smoke mask segmentation network is as shown in FIG. 2. The VGG16 network model structurally includes 13 convolutional Layers and three fully connected layers, so that outstanding effects are achieved in image classification. Specifically, the first five convolutional blocks of the VGG16 network are used as the basis for an encoding stage of the smoke mask segmentation network; and the number of trainable parameters is reduced to speed up the training. Further, in order to acquire multi-scale features and maintain detailed spatial information, the last three blocks of the encoding stage are combined into a decoding stage, increasing the network depth to capture more global information, and adding jump connection between an encoder and a decoder. Output feature maps of the convolutional layers are extracted at the encoder, and these feature maps are then upsampled to sizes of feature maps corresponding to the decoder for feature cascading operations, thus obtaining the smoke mask image.

The smoke removal network is an image-to-image transformation framework based on a cycle consistency generative adversarial network. The smoke removal network includes a dual-domain generator network and a dual-domain discriminator network. The purpose of the generator is to synthesize images that are sufficiently realistic to fool the discriminator, and the purpose of the discriminator is to correctly distinguish real images from synthetic images. The dual-domain generator network and the dual-domain discriminator network are trained in the generative adversarial network together, so as to learn two mapping functions. One mapping function transforms an image from a smoke image domain Domain S to a smoke-free image domain Domain SF (i.e. from a source domain to a target domain), and the other mapping function transforms an image from the smoke-less image domain Domain SF to the smoke image domain Domain S (i.e. from the target domain to the source domain).

The dual-domain generator network includes a source domain generator GY configured to generate a predicted smoke-free image and a target domain generator GX configured to generate a predicted smoke-free image. That is, the target domain generator GX generates a synthetic smoke-free image, while the source domain generator GY generates a synthetic smoke image.

The dual-domain discriminator network includes a source domain discriminator DY configured to distinguish a real smoke image from the predicted smoke image, and a target domain discriminator DX configured to distinguish a real smoke-free image from the predicted smoke-free image. That is, the role of the target domain discriminator DX is to distinguish the synthetic smoke-free image from the real smoke-free image, while the role of the source domain discriminator DY is to distinguish the synthetic smoke image from the real smoke image. For fog removal of the laparoscopic image, a smoke laparoscopic image is an input, and a synthesized smoke-free laparoscopic image is an output.

Finally, the present invention considers using two domain discriminators for domain discrimination respectively. Meanwhile, a discrimination loss of the dual-domain discriminator network may use different hyperparameters or the same hyperparameter. Different hyperparameters are used for the discrimination loss of the dual-domain discriminator, so that the two domain discriminators have different discriminative abilities for the source domain and the target domain, and the dual-domain discriminator better optimizes a feature extraction network in an adversarial network to extract more features with domain non-deformation.

Figure 4:
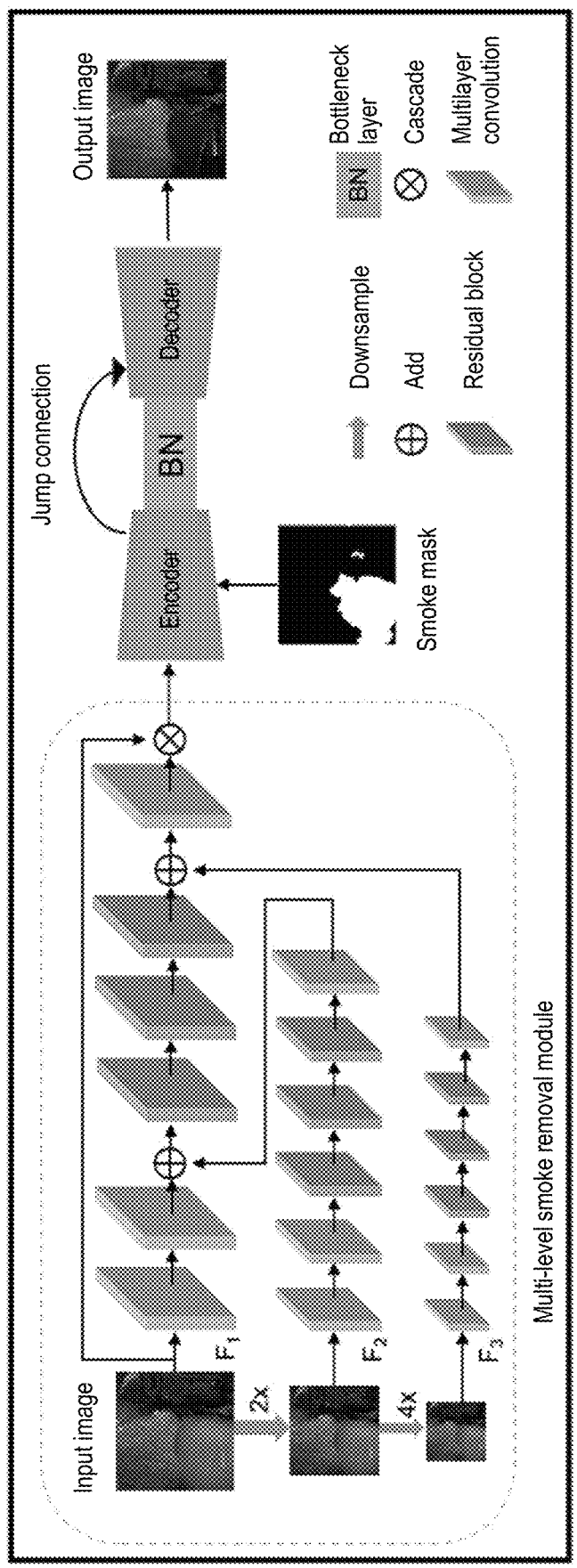
FIG. 4 is another schematic diagram of a smoke removal network according to an embodiment of the present invention.

FIG. 4 is another schematic diagram of a smoke removal network according to an embodiment of the present invention. As shown in FIG. 4, the smoke removal network (SRN) takes a single RGB laparoscopic image and a smoke mask image as inputs, and generates a smoke-free laparoscopic image. The SRN can be but is not limited to a ResNet model structure, which is a typical encoder-decoder structure.

In a generator network, an encoder includes a multi-level smoke feature extractor, i.e. MSR, and performs downsampling through four convolutional layers with a stride of 2. On the other hand, a decoder includes a transposed convolution for upsampling and a cascade of jump connection. Once an output of the last layer of the decoder achieves a desired spatial resolution, a convolution operation is performed to obtain an output image with the same size as the input image.

In a discriminator network, a discriminator uses Patch-GAN to discriminate a generated fake image from a real image, divides the image into slices, determines the authenticity of each slice separately, and then averages final results. In a specific implementation process, the size of each slice used is 70×70.

The multi-level smoke feature extractor includes a backbone network F1, a branch network F2, and a branch network F3. The laparoscopic image sample to be processed is input into the F1 backbone network for feature extraction. Two-fold downsampling and four-fold downsampling are performed respectively on the laparoscopic image sample to be processed, and sampled images are respectively taken as inputs of the branch network F2 and the branch network F3. A low-level smoke texture information feature is extracted using the branch network F2. A high-level smoke semantic information feature is extracted using the branch network F3. The F1 backbone network acquires a light smoke feature vector and a heavy smoke feature vector according to the low-level smoke texture information feature and the high-level smoke semantic information feature. Specifically, the MSR is composed of three branches of different sizes. The detailed structure of the module is as shown in FIG. 3. An original image (the laparoscopic image sample to be processed) is input to the branch F1 as a backbone of the MSR, and the original image is downsampled to be minimized to two and four times the original image respectively to form the branch F2 and the branch F3. The branch F2 and the branch F3 extract smoke features at different levels respectively to assist the feature extraction process of the backbone F1. In the MSR, a pyramidal connection is used to better extract the features. Specifically, the input image of the branch F1 is downsampled to form inputs of the branch F2 and the branch F3. The features extracted by the branch F2 contain low-level structural details of the scenario, and the features extracted by the branch F3 contain high-level semantic information. In the process of laparoscopic image smoke removal, due to the non-uniformity of smoke in a laparoscopic image, it is necessary to deal with both light smoke and heavy smoke. Therefore, it is necessary to extract both the low-level texture information of the image and the high-level semantic information of the image. Therefore, the features extracted by the branch F2 are connected to a shallower layer, and the features extracted by the branch F3 are connected to a deeper layer. With the information support of the branches F2 and F3, the branch F1 can jointly extract light smoke and heavy smoke features.

In a specific implementation process, the module also uses residual learning to make learning more efficient and allow the information to flow from the input layer to the output layer. That is to say, residual learning can be used to adjust the extracted image features to alleviate the gradient disappearance problem caused by increasing the depth in a deep neural network.

In a specific implementation process, the laparoscopic image smoke removal method based on the generative adversarial network includes steps S110-S130.

S110, a laparoscopic image sample to be processed is processed using a smoke mask segmentation network to acquire a smoke mask image, wherein the smoke mask image includes smoke position information and smoke density information.

Mask: It refers to using a selected image, graph or object to shield all or part of a target image to be processed. For example, a background area in the target image can be shielded, thereby controlling a processed area of the image or a processing process. In this embodiment of the present application, the mask can be represented as a binarization matrix, which is used for distinguishing an area where a target object to be segmented in the image and the background area. For example, an element corresponding to the area where the target object is located takes a value of 1, and elements of other areas take a value of 0. Applying a mask can extract an area of interest in the target image and shield areas that do not participate in the operation.

In the specific implementation process, the laparoscopic image sample to be processed is from a laparoscopic surgery video. Laparoscopic images are acquired according to the laparoscopic surgery video, and then are normalized. The sizes of all the images are adjusted to 256×256, and the images then undergo preprocessing such as image denoising and data enhancement. Specifically, the preprocessing process may include transforming the laparoscopic image into a pixel value matrix, and then normalize the pixel value matrix to obtain a digital matrix corresponding to the laparoscopic image. The specific steps of the processing process are not limited in this embodiment of the present application. Of course, the preprocessing process may also be performed by the smoke mask segmentation network, which is not limited in this embodiment of the present application.

In one specific embodiment, the smoke mask segmentation network is a VGG16 network model. A high-dimensional spatial feature map of the laparoscopic image to be processed is acquired through the VGG16 network, and then smoke features and background features of the laparoscopic image are extracted from the high-dimensional spatial feature map. A pixel point array corresponding to the smoke features is formed into a mask. Thus, the smoke mask image includes various pieces of information about smoke, including but not limited to smoke position information and smoke density information.

S120, the laparoscopic image sample to be processed and the smoke mask image are input into a smoke removal network, and features of the laparoscopic image sample to be processed are extracted using a multi-level smoke feature extractor to acquire a light smoke feature vector and a heavy smoke feature vector.

In order to achieve the purpose of maintaining real details of a smoke-free area while removing smoke, in a specific embodiment, the multi-level smoke feature extraction module is used to extract image features at different levels. Each neural network of the multi-level smoke feature extraction module may be composed of a convolutional layer and a pooling layer, and the structure of each neural network may be the same or different. The specific structure of each neural network is not limited in this embodiment of the present application.

Low-level features contain underlying structural details of the image, and high-level features contain high-level semantic information of the image. Light smoke usually leads to loss of image details or textures, so the removal of the light smoke mainly relies on low-level information, and the removal of heavy smoke mainly relies on high-level information to restore lost semantic information.

The smoke removal network is an image-to-image transformation framework based on a cycle consistency generative adversarial network. The smoke removal network includes a dual-domain generator network and a dual-domain discriminator network. The dual-domain generator network and the dual-domain discriminator network are trained in the generative adversarial network together.

It should be noted that the discriminator is used in the generative adversarial network (GAN), and includes a calculation model used for training, according to a received feature representation z, data indicating whether a specific data item is associated with the source domain or a certain domain (for example, the target domain). The purpose of the discriminator is to separate source features from target features through the aforementioned adversarial learning. As the calculation model, the discriminator may include a group of parameters or weights which may be iteratively adapted (trained), according to an adversarial loss function serving as a part of a gradient descent algorithm, to reduce or minimize the adversarial loss function. As training proceeds iteratively, with the understanding of predicted values, the discriminator can be iteratively updated to improve the separation of the source features from the target features. In addition, the gradient can be reversed by multiplying −1, which can acquire a reverse gradient that represents a feature loss.

S130, a smoke-free laparoscopic image is acquiring, according to the light smoke feature vector, the heavy smoke feature vector and the smoke mask image, by filtering out smoke information and maintaining a laparoscopic image by using a mask shielding effect.

In the laparoscopic image smoke removal model based on the generative adversarial network of the present invention, a smoke laparoscopic image is an input, and a synthesized smoke-free laparoscopic image is an output. The model is used to detect the laparoscopic image to be processed. After the position information of "smoke" and "laparoscopic image" in a laparoscopic image photo is acquired, the instances of "smoke" and "laparoscopic image" are erased according to a mask output by the network, that is, the RGB three-channel pixel values of the two parts are set to be 0.

The present invention provides a lightweight laparoscopic smoke removal model, which can be embedded in a laparoscopic device for real-time smoke removal, and can improve the visibility of a laparoscopic surgery in the presence of smoke. Based on the cycle consistency generative adversarial network, the model can recover the overall situation and details of the laparoscopic image. The laparoscopic image smoke removal model based on the generative adversarial network of the present invention includes a smoke mask segmentation network and a smoke removal network, and the laparoscopic image smoke removal model based on the generative adversarial network is obtained after training through a training set. A method for acquiring the training set includes: labeling a laparoscopic surgery video data set to acquire a real smoke laparoscopic image and a real smoke-free laparoscopic image; processing the real smoke-free laparoscopic image using image rendering software Blender to acquire a synthetic smoke laparoscopic image corresponding to the real smoke-free laparoscopic image; and forming the training set by the real smoke laparoscopic image, the real smoke-free laparoscopic image and the synthetic smoke laparoscopic image. In one specific embodiment, the data set that is used may include but is not limited to a cholecystectomy video data set (Cholec80).

In a specific implementation process, in order to improve the training efficiency, a test set needs to be evaluated. If the test set is a synthetic data set, quantitative evaluation is performed according to a peak signal-to-noise ratio (PSNR) and a structural similarity (SSIM) indicator. If the test set is a real data set, there is no paired smoke-free image, so three no-reference indicators are used for performance evaluation. The no-reference indicators may be but are not limited to a no-reference image spatial quality evaluator (BRISQUE), a perception-based image quality evaluator (PIQUE) and a fog aware density evaluator (FADE) which are used to perform the quantitative evaluation on the real data set. The test set will also be obtained while the training set is obtained. By using the test set to test the laparoscopic smoke removal model based on the generative adversarial network of the present invention, it is found that the smoke can be removed from the laparoscopic survey image, and a real tissue color can be restored, without affecting the smoke-free area, which can effectively improve the image quality.

The laparoscopic image smoke removal model based on the generative adversarial network of the present invention constrains a training network by combining a smoke area perception loss, a dark channel priori loss, and a contrast loss. These losses help model different smoke components and generate visually higher-quality smoke-free images. Specifically, a complete training loss is composed of five loss functions, namely the adversarial loss, the cycle consistency loss, the smoke area perception loss, the dark channel priori loss, and the contrast loss.

The smoke mask segmentation network and the smoke removal network use a loss function for training constraining. In the loss function, for a target of being from a smoke image domain to a smoke-free image domain (S-SF), a total network loss LNet is achieved by the following formula:

$$L_{Net}=L_{GAN}(G_x,D_x,S,SF)+\lambda_1 L_{cyc}(G_x,G_y)+\lambda_2 L_{sap}(x)+\lambda_3 L_{dcp}(x)+\lambda_4 L_{ce}(x),$$

where LGAN(Gx, Dx, S, SF) is an adversarial network used for training the generative adversarial network; Lcyc(Gx, Gy) is a cycle consistency loss used for training a generator network; Ldcp is a dark channel priori loss used for training a discriminator network; Lsap is a smoke area perception loss used for training the smoke mask segmentation network; Lce is a contrast loss; and $\lambda_1$, $\lambda_2$, $\lambda_3$, and $\lambda_4$ are loss function hyperparameters.

That is, the overall objective function of the laparoscopic image smoke removal model based on the generative adversarial network is composed of five loss functions: the generative adversarial loss, the cycle consistency loss, the smoke area perception loss, the dark channel priori loss, and the contrast loss. Analytical selection is performed on the weights of different loss functions helps to obtain images with the best smoke removal effect.

Specifically, the smoke area perception loss is achieved by the following formula:

$$L_{sap}(x) = \frac{1}{N}\left[a_1 \sum_{x\in R} U_D(x) + \sum_{x\in R} M_x U_D(x)\right]$$

wherein $U_D(x) = |U_{GT}(x) - U_{OUT}(x)|$ where N represents the total number of image pixels; R represents a smoke area recognized by the smoke mask segmentation network in an input image; x represents an index in the image; UGT and UOUT respectively represent a real image and a network output image; a1 represents a penalty weight in a smoke-free area; Mx represents a smoke area penalty weight; and $a_1=0.2$; $M_x \subset [0.5,1]$, the penalty weight a1 in the smoke-free area is a fixed value; and in a smoke area, the smoke area penalty weight Mx is set according to the intensity in real smoke.

That is, the purpose of laparoscopic image smoke removal is to eliminate undesired smoke in the corresponding smoke area, and the smoke-free area should not be affected in the smoke removal process. Therefore, in the smoke-free area, a fixed penalty weight is set to prevent the pixels in the smoke-free area from changing greatly. For the smoke area, the penalty weight Mx is set according to the intensity in the real smoke due to the non-uniform distribution of smoke. Compared with the L2 loss where constant weights are set for all pixels, this smoke area perception mechanism can adaptively optimize the pixels in the smoke area and prevent color distortion of the smoke-free area. In addition, the mechanism uses a corrected smoke area mask for loss calculation, and penalizes the pixels of the smoke-free area with the fixed weights, thus solving the problem of the non-uniform distribution of smoke. Therefore, a better image reconstruction result can be obtained by using the smoke area perception loss function.

In order to improve the laparoscopic image smoke removal performance, the dark channel priori loss is provided in combination with a dark channel priori principle. First, the dark channel priori model is achieved by the following formula:

$$J^{dark}(x) = \min_{c\in\{r,g,b\}}\left(\min_{y\in\Omega(x)}(J^c(y))\right)$$

Where Jc represents a color channel of image J; $\Omega(x)$ is a local slice centered at x; and Jdark represents a dark channel. If J is a fogless natural image, a dark channel value is relatively low and tends to zero. Therefore, the dark channel value can be regarded as a feature representing the density of smoke. The dark channel priori loss Ldcp is defined as:

$$L_{dcp}(x) = \frac{1}{N}\sum_x [W(U_{GT}(x)) - W(U_{OUT}(x))]$$

where W represents a dark channel operation; N represents the total number of image pixels; and UGT and UOUT respectively represent a real image and a network output image.

Most pixels in the smoke-free laparoscopic image have a low-density value. However, due to the brightness effect and light reflection, a few of pixels of the smoke-free image still have a high-density value. In order to fairly and reasonably calculate an input dark channel value, the impact of an extremely small or large pixel value is prevented by calculating its average density. Therefore, Ldcp is added to the two discriminators separately, which can take most of the pixels covered by the smoke into account, facilitating parameter optimization of the generator.

In one specific embodiment, for the contrast loss, the quality of the image can be defined as a ratio of a variance ($\sigma^2$) of the image intensity to a mean value (u). Furthermore, a contrast enhancement factor (CEF) represents a contrast enhancement level of the input image in the reconstructed image. If a CEF value is greater than 1, it indicates that the contrast of the processed image is increased relative to the contrast of the input image. The contrast loss can take image color restoration into account, ensuring that the color of the generated image can be consistent with that of the real image and that a large color difference will not be caused. The formula of the CEF is as follows:

$$CEF = \frac{Q_{OUT}}{Q_{GT}},$$

$$Q = \frac{\sigma^2}{u}$$

where QGT is the contrast of the real image, and QOUT is the contrast of the corresponding output image.

Since the smoke is considered to be a phenomenon that reduces the contrast of an image, the contrast loss is defined as:

$$L_{ce}(x) = \frac{1}{CEF}$$

In general, the contrast lossLce(x) reduces the smoke by taking a reciprocal of the CEF as a loss function. In a case of minimizing the contrast loss, the laparoscopic image smoke removal model based on the generative adversarial network of the present invention can maximize the overall contrast of the generated image. The contrast loss is applied to the laparoscopic image smoke removal to achieve the purpose of better restoring the real color of the image.

In one specific embodiment, the generative adversarial loss (LGAN) is used for two mapping functions: from a smoke image domain to a smoke-free image domain (S-SF) and from the smoke-free image domain to the smoke image domain (SF-S). For one mapping (for example, S-SF), the adversarial loss function LGAN(Gx, Dx, S, SF)can be expressed as:

$$L_{GAN}(G_x, D_x, S, SF) = E_{sf \sim P_{data}(s)}[\log D_x(sf)] + E_{s \sim P_{data}(sf)}[\log(1 - D_x(G_x(s)))]$$

where s and sf are input images in the smoke image domain S and the smoke-free image domain SF respectively. The generator GX transforms the image from the smoke image domain S to the smoke-free image domain SF, and the discriminator DX distinguishes the generated image from the real image. Similarly, an SF-S loss function LGAN (Gy, Dy, SF, S) is derived in the same way.

Specifically, in order to ensure the mapping accuracy from input to output in the target domain, the cycle consistency loss Lcyc (Gx, Gy) is introduced. The cycle consistency loss includes a forward cycle consistency loss and a backward cycle consistency loss. This loss is only applicable to the generator network, and can constrain model parameters of the generator, so as to output a more real synthetic image.

The cycle consistency loss is achieved by the following formula:

$$L_{cyc}(G_x, G_y) = |G_x(G_y(sf)) - sf| + |G_y(G_x(s)) - s|$$

Where sf is the target domain; s is the source domain; and Gx and Gy are respectively the target domain generator and the source domain generator.

The multi-task learning strategy, which includes the generative adversarial loss, the cycle consistency loss, the smoke area perception loss, the dark channel priori loss, and the contrast loss, is adopted.

Parameters of the smoke mask segmentation network are corrected according to the smoke area perception loss, and parameters of the smoke removal network are corrected according to the generative adversarial loss, the cycle consistency loss, the dark channel priori loss, and the contrast loss.

In one specific embodiment, first, experimental hardware is built on an NVIDIA TESLA P100 device (16 GB video memory); a GPU is used for acceleration; and a PyTorch framework is used for all training and testing processes. In an experiment, an ADAM optimizer is used with an initial learning rate of 0.0001. Considering the memory capacity as well as model optimization and network training speed maximization, during training, Batch size is set to be 4, and a training epoch is 200.

The cholecystectomy video data set (Cholec80) is used. First, videos are manually labeled as smoke and smoke-free data; and second, video frames are exported in a picture format. In order to simulate the smoke generated in the laparoscopic surgery, the image rendering software Blender is used to synthesize corresponding smoke pictures with different concentrations. The data set includes 5,000 real smoke images, 15,000 real smoke-free images, and paired 15,000 synthetic smoke images. The images are then normalized, and all the images are resized to 256×256. After preprocessing techniques such as image denoising and data enhancement, the paired smoke and smoke-free images are input to the deep learning-based laparoscopic surgery image smoke removal model, and are continuously trained until the smoke is removed from the laparoscopic images.

Figure 5:
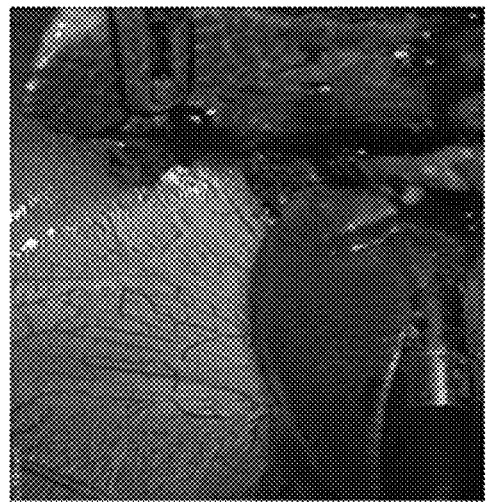
FIG. 5 is an effect comparison diagram of an input image and an output image according to an embodiment of the present invention.
Figure 5:
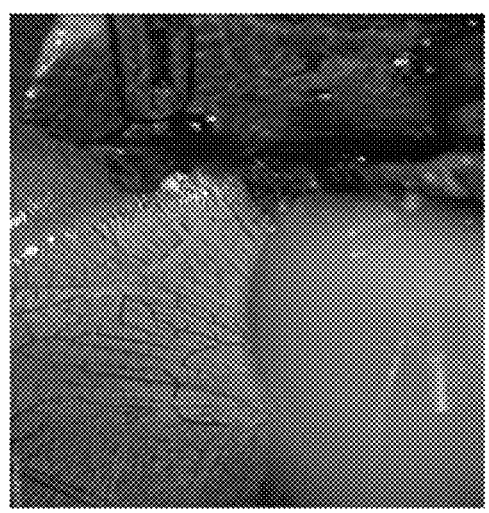

FIG. 5 is an effect comparison diagram of an input image and an output image according to an embodiment of the present invention. As shown in FIG. 5, after the laparoscopic image smoke removal model based on the generative adversarial network is used to remove the smoke, the output image has a better smoke removal effect than that of the input image.

The laparoscopic image smoke removal model based on the generative adversarial network of the present invention constrains the training network in combination with the loss function. In a network training process, an error between the output image and the input image is calculated according to the loss function, and parameters of an optimized network are adjusted using a back propagation algorithm. Specifically, a complete training loss is composed of five loss functions, namely the adversarial loss, the cycle consistency loss, the smoke area perception loss, the dark channel priori loss, and the contrast loss. The above loss functions help to model different smoke components, thereby generating smoke-free laparoscopic images with higher visual quality. After the above training process, the test set is used for testing, thus finally obtaining the trained laparoscopic image smoke removal model based on the generative adversarial network.

To sum up, in the present invention, by means of building a laparoscopic image smoke removal model based on a generative adversarial network, the laparoscopic image smoke removal model based on the generative adversarial network can restore the overall situation and details of a laparoscopic image on the basis of the cycle consistency generative adversarial network, and can remove, by using the dark channel loss constraint, the smoke in the laparoscopic surgery without the assistance of any mechanical device. Image features of different levels are extracted using a multi-level smoke feature extraction module. The laparoscopic image smoke removal model has the effect of improving the texture details of the smoke-free laparoscopic image, has the robustness, and can be embedded in the laparoscopic device for use. In addition, consecutive video frames containing different smoke concentrations in each video are validated to evaluate practical laparoscopic surgery scenarios.

Figure 6:
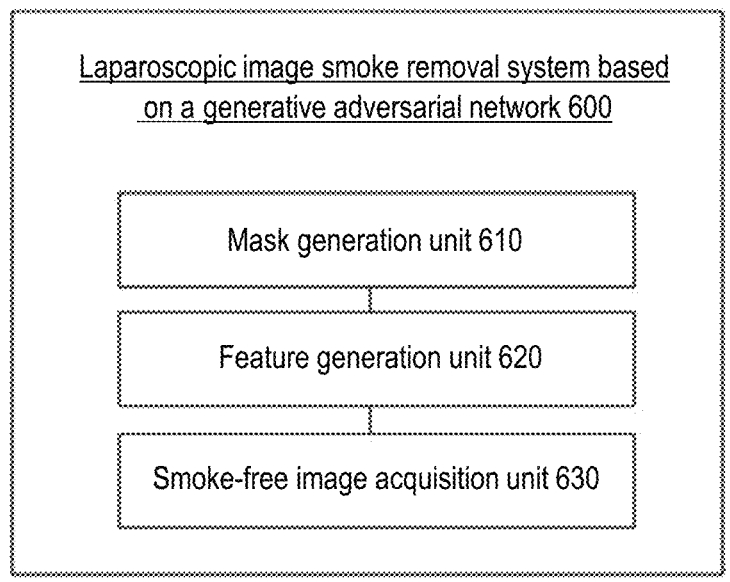
FIG. 6 is a logic structural block diagram of a laparoscopic image smoke removal system based on a generative adversarial network according to an embodiment of the present invention.

Corresponding to the above-mentioned laparoscopic image smoke removal method based on the generative adversarial network, the present invention further provides a laparoscopic image smoke removal system based on a generative adversarial network. FIG. 6 shows functional modules of the laparoscopic image smoke removal system based on a generative adversarial network according to an embodiment of the present invention.

As shown in FIG. 6, the laparoscopic image smoke removal system 600 based on a generative adversarial network provided by the present invention can be installed in an electronic device. According to the implemented functions, the laparoscopic image smoke removal system 600 based on the generative adversarial network may include a mask generation unit 610, a feature generation unit 620, and a smoke-free image acquisition unit 630. Unit described in the present invention can also be referred to as module, which refers to a series of computer program segments that can be executed by a processor of the electronic device and can complete a certain fixed function. The computer program segments are stored in a memory of the electronic device.

In this embodiment, the functions of the various modules/units are as follows:

The mask generation unit 610 is configured to process a laparoscopic image sample to be processed using a smoke mask segmentation network to acquire a smoke mask image, wherein the smoke mask image comprises smoke position information and smoke density information.

The feature generation unit 620 is configured to input the laparoscopic image sample to be processed and the smoke mask image into a smoke removal network, and process the laparoscopic image sample to be processed using a multi-level smoke feature extractor to acquire a light smoke feature and a heavy smoke feature.

The smoke-free image acquisition unit 630 is configured to acquire, according to the light smoke feature vector, the heavy smoke feature vector and the smoke mask image, a smoke-free laparoscopic image by filtering out smoke information and retaining a laparoscopic image by using a mask shielding effect.

More specific implementations of the above-mentioned laparoscopic image smoke removal system based on a generative adversarial network provided by the present invention may all refer to the embodiments of the above-mentioned laparoscopic image smoke removal method based on a generative adversarial network, and will not be listed one by one here.

According to the above-mentioned laparoscopic image smoke removal system based on a generative adversarial network provided by the present invention, the smoke mask image is acquired by means of setting the smoke mask segmentation network; the smoke-free laparoscopic image is acquired according to the smoke mask image using the smoke removal network; real details of a smoke-free area can be maintained while the smoke is removed; and the system has a technical effect of improving the texture details of the smoke-free laparoscopic image.

Figure 7:
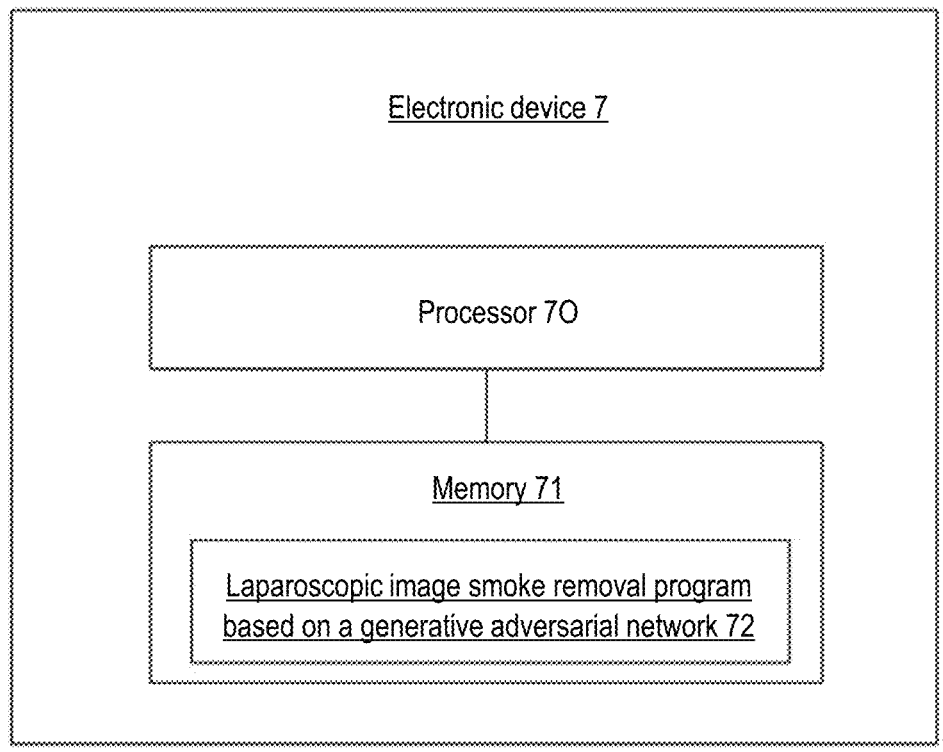
FIG. 7 is a schematic internally structural diagram of an electronic device for implementing a laparoscopic image smoke removal method based on a generative adversarial network according to an embodiment of the present invention.

As shown in FIG. 7, the present invention provides an electronic device 7 to implement the laparoscopic image smoke removal method based on a generative adversarial network.

The electronic device 7 may include a processor 70, a memory 71, and a bus, and may also include a computer program stored in the memory 71 and run on the processor 70, such as a laparoscopic image smoke removal program 72 based on a generative adversarial network.

The memory 71 at least includes one type of readable storage medium which includes a flash memory, a mobile hard disk, a multimedia card, a card-type memory (for example: an SD or DX memory), a magnetic memory, a magnetic disk, an optical disk, and the like. The memory 71 may be an internal storage unit of the electronic device 7 in some embodiments, such as a mobile hard disk of the electronic device 7. In some other embodiments, the memory 71 may also be an external storage device of the electronic device 7, such as a pluggable mobile hard disk, a smart media card (SMC), a secure digital (SD) card, and a flash card which are provided on the electronic device 7. Further, the memory 71 may also include both an internal storage unit of the electronic device 7 and an external storage device. The memory 71 can not only be configured to store the application software installed in the electronic device 7 and various data, such as codes of the laparoscopic image smoke removal program based on the generative adversarial network, but also can be configured to temporarily store data that has been output or is to be output.

In some embodiments, the processor 70 may be composed of integrated circuits, for example, a single packaged integrated circuit, or may be composed of multiple integrated circuits packaged with the same function or different functions, including one of or a combination of more of a central processing unit (CPU), a microprocessor, a digital processing chip, a graphics processor, various control chips, and the like. The processor 70 is a control unit of the electronic device. Various components of the entire electronic device are connected using various interfaces and lines. By running or executing the programs or modules (for example, the laparoscopic image smoke removal program based on the generative adversarial network) stored in the memory 71, and invoking the data stored in the memory 71, various functions of the electronic device 7 are executed, and the data is processed.

The bus may be a peripheral component interconnect (PCI) bus or an extended industry standard architecture (EISA) bus or the like. The bus can be divided into an address bus, a data bus, a control bus, and the like. The bus is configured to implement connection and communication between the memory 71 and at least one processor 70.

FIG. 7 only shows the electronic device with the components. Those skilled in the art can understand that the structure shown in FIG. 7 does not constitute a limitation on the electronic device 7, and may include fewer or more components than those shown in the drawings, or combinations of some components, or different component arrangements.

For example, although not shown, the electronic device 7 may also include a power supply (such as a cell) for supplying power to the various components. Preferably, the power supply may be logically connected to the at least one processor 70 through a power management device, so that functions such as charging management, discharging management, and power consumption management can be achieved through the power management device. The power supply may also include one or more direct current or alternating current power supplies, a recharging device, a power failure detection circuit, a power converter or inverter, a power status indicator, and any other components. The electronic device 7 may also include various sensors, Bluetooth modules, Wi-Fi modules, etc., which will not be repeated here.

Further, the electronic device 7 may also include a network interface. Optionally, the network interface may include a wired interface and/or a wireless interface (such as a WI-FI interface and a Bluetooth interface), which is usually used for establishing communication connection between the electronic device 7 and other electronic devices.

Optionally, the electronic device 7 may also include a user interface. The user interface may be a display, an input unit (such as a keyboard). Optionally, the user interface may also be a standard wired interface or wireless interface. Optionally, in some embodiments, the display may be a light-emitting diode (LED) display, a liquid crystal display, a touch-control liquid crystal display, an organic light-emitting diode (OLED) touch device, and the like. The display may also be appropriately referred to as a display screen or a display unit, which is configured to display information processed in the electronic device 7 and to display a visual user interface.

It should be understood that the embodiments are only used for illustration, and are not limited by this structure in the scope of the patent application.

The laparoscopic image smoke removal program 72 based on the generative adversarial network stored in the memory 71 in the electronic device 7 is a combination of multiple instructions. When run in the processor 70, the laparoscopic image smoke removal program can implement: S110, processing a laparoscopic image sample to be processed using a smoke mask segmentation network to acquire a smoke mask image, wherein the smoke mask image comprises smoke position information and smoke density information; S120, inputting the laparoscopic image sample to be processed and the smoke mask image into a smoke removal network, and extracting features of the laparoscopic image sample to be processed using a multi-level smoke feature extractor to acquire a light smoke feature vector and a heavy smoke feature vector; and S130, acquiring, according to the light smoke feature vector, the heavy smoke feature vector and the smoke mask image, a smoke-free laparoscopic image by filtering out smoke information and maintaining a laparoscopic image by using a mask shielding effect.

Specifically, the specific implementation method of the above-mentioned instructions by the processor 70 may refer to the description of the relevant steps in the embodiment corresponding to FIG. 1, and will not be repeatedly described here. It should be emphasized that in order to further ensure the privacy and security of the above-mentioned laparoscopic image smoke removal program based on the generative adversarial network, the above-mentioned laparoscopic image smoke removal program based on the generative adversarial network is stored in a node of a blockchain where the server cluster is located.

Further, the modules/units integrated in the electronic device 7, if implemented in the form of a software functional unit and sold or used as standalone products, may be stored in a computer-readable storage medium. The computer-readable medium may include: any entity or device capable of carrying the computer program code, a recording medium, a USB flash disk, a mobile hard disk, a magnetic disk, an optical disk, and a computer memory, a read-only memory (ROM).

An embodiment of the present invention further provides a computer-readable storage medium. The storage medium may be non-volatile or volatile, and the storage medium stores a computer program. The computer program, when executed by a processor, implements: S110, processing a laparoscopic image sample to be processed using a smoke mask segmentation network to acquire a smoke mask image, wherein the smoke mask image comprises smoke position information and smoke density information; S120, inputting the laparoscopic image sample to be processed and the smoke mask image into a smoke removal network, and extracting features of the laparoscopic image sample to be processed using a multi-level smoke feature extractor to acquire a light smoke feature vector and a heavy smoke feature vector; and S130, acquiring, according to the light smoke feature vector, the heavy smoke feature vector and the smoke mask image, a smoke-free laparoscopic image by filtering out smoke information and maintaining a laparoscopic image by using a mask shielding effect.

Specifically, when the computer program is executed by the processor, the specific implementation method may refer to the description of the relevant steps in the laparoscopic image smoke removal method based on the generative adversarial network in this embodiment, and will not be repeatedly described here.

In the several embodiments provided by the present invention, it should be understood that the disclosed device, apparatus and method may be implemented in other manners. For example, the apparatus embodiments described above are only illustrative. For example, the division of the modules is only a logical function division, and there may be other division manners in actual implementation.

The modules described as separate components may or may not be physically separated, and the components displayed as modules may or may not be physical units, that is, they may be located in one place, or they may be distributed on multiple network units. Some or all of the modules may be selected according to actual needs to achieve the objectives of the solutions of the embodiments.

In addition, all functional modules in all the embodiments of the present invention can be integrated into one processing unit, or each unit can physically exist alone, or two or more units can be integrated in one unit. The above integrated units can be implemented in the form of hardware, or can be implemented in the form of hardware plus software functional units.

For those skilled in the art, it is apparent that the present invention is not limited to the details of the demonstrative embodiments mentioned above, and that the present invention can be realized in other specific forms without departing from the spirit or basic features of the present invention.

Therefore, from any point of view, the embodiments should be regarded as exemplary and non-limiting. The scope of the present invention is defined by the appended claims rather than the above description. Therefore, all changes falling within the meanings and scope of equivalent elements of the claims are intended to be included in the present invention. No associated drawing markings in claims shall be deemed to limit the claims involved.

The blockchain referred to in the present invention is a new application mode of computer technologies such as distributed data storage, peer-to-peer transmission, a consensus mechanism, and an encryption algorithm. Blockchain, essentially a decentralized database, is a series of data blocks produced by association using a cryptographic method. Each data block contains information of a batch of network transactions to validate the validity (the anti-counterfeiting performance) of the information and generate a next block. The blockchain may include a blockchain underlying platform, a platform product service layer, an application service layer, etc. The blockchain can store medical data, such as personal health files, and inspection reports.

Furthermore, it is clear that the term "include" does not exclude other units or steps, and the singular does not exclude the plural. The multiple units or apparatuses recited in the system claims can also be implemented by one unit or apparatus by means of software or hardware. The terms such as second are used for denoting the names and do not denote any particular order.

It should be finally noted that the above embodiments are merely illustrative of the technical solutions of the present invention, and are not intended to be limitations. Although the present invention is described in detail with reference to the preferred embodiments, it should be understood that those of ordinary skill in the art can make modifications or equivalent replacements to the technical solutions of the present invention without departing from the spirit and scope of the technical solutions of the present invention.

What is claimed is:

1. A laparoscopic image smoke removal method based on a generative adversarial network, comprising:
   processing a laparoscopic image sample to be processed using a smoke mask segmentation network to acquire a smoke mask image, wherein the smoke mask image comprises smoke position information and smoke density information;
   inputting the laparoscopic image sample to be processed and the smoke mask image into a smoke removal network, and extracting features of the laparoscopic image sample to be processed using a multi-level smoke feature extractor to acquire a light smoke feature vector and a heavy smoke feature vector;
   wherein a method for extracting the features of the laparoscopic image sample to be processed using the multi-level smoke feature extractor to acquire the light smoke feature vector and the heavy smoke feature vector comprises: the multi-level smoke feature extractor comprising a F1 backbone network, a F2 branch network, and a F3 branch network; inputting the laparoscopic image sample to be processed into the F1 backbone network for a feature extraction; performing two-fold downsampling and four-fold downsampling respectively on the laparoscopic image sample to be processed, and taking sampled images respectively as inputs of the F2 branch network and the F3 branch network; extracting a low-level smoke texture information feature using the F2 branch network; extracting a high-level smoke semantic information feature using the F3 branch network; and acquiring, by the F1 backbone network, the light smoke feature vector and the heavy smoke feature vector according to the low-level smoke texture information feature and the high-level smoke semantic information feature; and
   acquiring, according to the light smoke feature vector, the heavy smoke feature vector and the smoke mask image, a smoke-free laparoscopic image by filtering out smoke information and maintaining a laparoscopic image by using a mask shielding effect;
   wherein the smoke mask segmentation network and the smoke removal network perform training constraining using a loss function, and the loss function is achieved by the following formula:

$L_{Net} = L_{GAN}(G_x, D_x, S, SF) + \lambda_1 L_{cyc}(G_x, G_y) + \lambda_2 L_{sap}(x) + \lambda_3 L_{dcp}(x) + \lambda_4 L_{ce}(x),$ where $L_{GAN}(G_x, D_x, S, SF)$ is an adversarial loss used for training the generative adversarial network; $L_{cyc}(G_x, G_y)$ is a cycle consistency loss used for training a generator network; Ldcp is a dark channel priori loss used for training a discriminator network; Lsap is a smoke area perception loss used for training the smoke mask segmentation network; $L_{ce}$ is a contrast loss; sf is a target domain; s is a source domain; $G_x$ and $G_y$ are respectively a target domain generator and a source domain generator; $D_x$ is a target domain discriminator; and $\lambda_1$, $\lambda_2$, $\lambda_3$, and $\lambda_4$ are loss function hyperparameters.

2. The laparoscopic image smoke removal method based on the generative adversarial network according to claim 1, wherein the smoke removal network comprises a dual-domain generator network and a dual-domain discriminator network; the dual-domain generator network and the dual-domain generator network are trained in the generative adversarial network together; the dual-domain generator network comprises the source domain generator configured to generate a predicted smoke image, and the target domain generator configured to generate a predicted smoke-free image; and the dual-domain discriminator network comprises a source domain discriminator configured to distinguish a real smoke image from the predicted smoke image, and the target domain discriminator configured to distinguish a real smoke-less image from the predicted smoke-free image.

3. The laparoscopic image smoke removal method based on the generative adversarial network according to claim 1, wherein the smoke mask segmentation network and the smoke removal network are trained through a training set, and a method for acquiring the training set comprises:
   labeling a laparoscopic surgery video data set to acquire a real smoke laparoscopic image and a real smoke-free laparoscopic image;
   processing the real smoke-free laparoscopic image using image rendering software Blender to acquire a synthetic smoke laparoscopic image corresponding to the real smoke-free laparoscopic image; and forming the training set by the real smoke laparoscopic image, the real smoke-free laparoscopic image, and the synthetic smoke laparoscopic image.

4. The laparoscopic image smoke removal method based on the generative adversarial network according to claim 1, wherein the smoke area perception loss is achieved by the following formula:

$$L_{sap}(x) = \frac{1}{N}\left[\alpha_1 \sum_{x \notin R} U_D(x) + \sum_{x \in R} M_x U_D(x)\right],$$

where $U_D(x) = |U_{GT}(x) - U_{OUT}(x)|$ where N represents a total number of image pixels; R represents a smoke area, which is recognized by the smoke mask segmentation network in an input image; x represents an index in an image; $U_{GT}$ and $U_{OUT}$ respectively represent a real image and a network output image; a1 represents a penalty weight in a smoke-free area; Mx represents a smoke area penalty weight; and $a_1 = 0.2$; $M_x \subset [0.5, 1]$, the penalty weight a1 in the smoke-free area is a fixed value; and in the smoke area, the smoke area penalty weight $M_x$ is set according to an intensity in real smoke.

5. The laparoscopic image smoke removal method based on the generative adversarial network according to claim 1, wherein the cycle consistency loss is achieved by the following formula:

$$L_{cyc}(G_x, G_y) = |G_x(G_y(sf)) - sf| + |G_y(G_x(s)) - s|$$

where sf is the target domain; s is the source domain; and $G_x$ and $G_y$ are respectively the target domain generator and the source domain generator.

6. A laparoscopic image smoke removal system based on a generative adversarial network, comprising a processor configured to process a laparoscopic image sample to be processed using a smoke mask segmentation network to acquire a smoke mask image, wherein the smoke mask image comprises smoke position information and smoke density information;

input the laparoscopic image sample to be processed and the smoke mask image into a smoke removal network, and process the laparoscopic image sample to be processed using a multi-level smoke feature extractor to acquire a light smoke feature and a heavy smoke feature, wherein a method for extracting features of the laparoscopic image sample to be processed using the multi-level smoke feature extractor to acquire a light smoke feature vector and a heavy smoke feature vector comprises: the multi-level smoke feature extractor comprising a backbone network F1, a branch network F2, and a branch network F3; inputting the laparoscopic image sample to be processed into the backbone network F1 for a feature extraction; performing two-fold downsampling and four-fold downsampling respectively on the laparoscopic image sample to be processed, and taking sampled images respectively as inputs of the branch network F2 and the branch network F3; extracting a low-level smoke texture information feature using the branch network F2; extracting a high-level smoke semantic information feature using the branch network F3; and acquiring, by the backbone network F1, the light smoke feature vector and the heavy smoke feature vector according to the low-level smoke texture information feature and the high-level smoke semantic information feature;

wherein the smoke mask segmentation network and the smoke removal network perform training constraining using a loss function, and the loss function is achieved by the following formula:

$$L_{Net} = L_{GAN}(G_x, D_x, S, SF) + \lambda_1 L_{cyc}(G_x, G_y) + \lambda_2 L_{sap}(x) + \lambda_3 L_{dcp}(x) + \lambda_4 L_{ce}(x),$$

where $L_{GAN}(G_x, D_x, S, SF)$ is an adversarial loss used for training the generative adversarial network; $L_{cyc}(G_x, G_y)$ is a cycle consistency loss used for training a generator network; Ldcp is a dark channel priori loss used for training a discriminator network; Lsap is a smoke area perception loss used for training the smoke mask segmentation network; $L_{ce}$, is a contrast loss; SF is a target domain; s is a source domain; $G_x$ and $G_y$ are respectively a target domain generator and a source domain generator; $D_x$ is a target domain discriminator; and $\lambda_1$, $\lambda_2$, $\lambda_3$, and $\lambda_4$ are loss function hyperparameters; and acquire, according to the light smoke feature vector, the heavy smoke feature vector and the smoke mask image, a smoke-free laparoscopic image by filtering out smoke information and maintaining a laparoscopic image by using a mask shielding effect.

7. An electronic device, the electronic device comprising:
at least one processor; and
a memory in communication connection with the at least one processor, wherein
the memory stores instructions executable by the at least one processor, the instructions, when executed by the at least one processor, cause the at least one processor to implement steps in the laparoscopic image smoke removal method based on the generative adversarial network according to claim 1.

8. A non-transitory computer-readable storage medium, storing a computer program, wherein the computer program, when executed by a processor, implements the laparoscopic image smoke removal method based on the generative adversarial network according to claim 1.

* * * * *